(12) United States Patent
Matoba

(10) Patent No.: US 8,875,275 B2
(45) Date of Patent: Oct. 28, 2014

(54) RULE VERIFICATION APPARATUS AND RULE VERIFICATION METHOD

(75) Inventor: Kazumine Matoba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1690 days.

(21) Appl. No.: 12/026,817

(22) Filed: Feb. 6, 2008

(65) Prior Publication Data

US 2008/0192637 A1 Aug. 14, 2008

(30) Foreign Application Priority Data

Feb. 13, 2007 (JP) ................................ 2007-032427

(51) Int. Cl.
H04L 29/06 (2006.01)
(52) U.S. Cl.
CPC .................. H04L 63/0263 (2013.01)
USPC .............. 726/13; 709/224; 370/236
(58) Field of Classification Search
USPC .............. 726/13; 370/236; 709/207
See application file for complete search history.

(56) References Cited

U.S. PATENT DOCUMENTS

| | | | |
|---|---|---|---|
| 5,673,279 A * | 9/1997 | Oskouy et al. | 714/819 |
| 2002/0112188 A1* | 8/2002 | Syvanne | 713/201 |
| 2005/0278431 A1* | 12/2005 | Goldschmidt et al. | 709/207 |
| 2007/0047448 A1* | 3/2007 | Chiu et al. | 370/241 |
| 2007/0276938 A1* | 11/2007 | Ottamalika et al. | 709/224 |

FOREIGN PATENT DOCUMENTS

| | | |
|---|---|---|
| JP | 8-249279 | 9/1996 |
| JP | 2002-152266 | 5/2002 |
| JP | 2006-209322 | 8/2006 |

OTHER PUBLICATIONS

Sharpe, Richard, and Ed Warnicke. Ethereal Users Guide. Lulu. com, 2001.*
Notification of Reasons for Refusal dated Aug. 16, 2011, from corresponding Japanese Application No. 2007-032427.

* cited by examiner

Primary Examiner — Vu Le
Assistant Examiner — Tracy Mangialaschi
(74) Attorney, Agent, or Firm — Katten Muchin Rosenman LLP

(57) ABSTRACT

A flow state monitoring part obtains a frame that is output from firewall units using former and new rules, and monitors a flow state to which each of the former and new rules is applied. When the flow has ended for both the former and new rules, the flow state monitoring part notifies a frame holding part of the end of the frame. Upon receiving the notice of the end of the flow, the frame holding part outputs two captured information items each including a group of frames for the flow in accordance with each rule to a flow comparison part. The flow comparison part compares the two captured information items, and abandons those captured information items if they completely coincide with each other. If there is a difference, the flow comparison part outputs those captured information items.

11 Claims, 16 Drawing Sheets

FIG. 3

| ENTRY | CLIENT IP | SERVER IP | CLIENT PORT | SERVER PORT | FW#1 STATE | FW#2 STATE |
|---|---|---|---|---|---|---|
| 1 | 10.0.0.1 | 20.0.0.1 | 22351 | 80 | IN CONNECTION | IN CONNECTION |
| 2 | 10.0.0.1 | 20.0.0.1 | 3001 | 21 | END | END |
| 3 | 10.0.0.1 | 20.0.0.1 | 3002 | 20 | IN CONNECTION | NON CONNECTION |
| ... | | | | | | |

FIG. 4

| ENTRY | FIRE WALL | RECEIVING TIME | DATA |
|---|---|---|---|
| 1 | FW#1 | 11:02:31 | DATA of FRAME 1 |
| | | 11:02:34 | DATA of FRAME 2 |
| | | 11:02:36 | DATA of FRAME 3 |
| | | 11:02:40 | DATA of FRAME 4 |
| | | 11:02:41 | DATA of FRAME 5 |
| ... | | | |

| ENTRY | FIRE WALL | RECEIVING TIME | DATA |
|---|---|---|---|
| 1 | FW#2 | 11:02:31 | DATA of FRAME 1 |
| | | 11:02:34 | DATA of FRAME 2 |
| | | 11:02:36 | DATA of FRAME 3 |
| | | 11:02:41 | DATA of FRAME 5 |
| ... | | | |

FIG. 7

| ENTRY | CLIENT IP | SERVER IP | CLIENT PORT | SERVER PORT | FW#1 STATE | FW#2 STATE |
|---|---|---|---|---|---|---|
| 1 | 10.0.0.1 | 20.0.0.1 | 22351 | 80 | IN CONNECTION | IN CONNECTION |
| 2 | 10.0.0.1 | 20.0.0.1 | 3001 | 21 | END | TO (Time Out) |
| 3 | 10.0.0.1 | 20.0.0.1 | 3002 | 20 | IN CONNECTION | NON CONNECTION |
| ... | | | | | | |

RULE VERIFICATION APPARATUS AND RULE VERIFICATION METHOD

BACKGROUND

Technical Field

The present art relates to a rule verification apparatus and a rule verification method for examining a change in traffic due to a difference between rules for controlling traffic. More specifically, the present art relates to a rule verification apparatus and a rule verification method that allow easy and low-cost verification of the correctness of a rule for traffic control.

In the related art, for example, in communication between a server and a client, a firewall unit may be occasionally placed on a network to prevent unauthorized access. The firewall unit is incorporated in, for example, a router or the like, and is placed between the server and the client. The firewall unit refers to the IP addresses, port numbers, etc., of a transmission source and destination contained in frames to detect an unauthorized frame, and abandons the detected frame to prevent unauthorized access. That is, the firewall unit blocks traffic according to a set rule to maintain network security.

Such a firewall rule is set by a network administrator, and detailed information other than the IP addresses and the port numbers described above, such as communication paths of frames and service types, can be specified. For example, in Japanese Unexamined Patent Application Publication No. 2006-209322, the automatic setup of a firewall rule is proposed.

If the rule is changed while a firewall is running, or if the firewall unit is replaced, the traffic to be blocked is changed in accordance with the change in rules. In this case, for example, due to incorrect setup of a rule, traffic other than the desired traffic may be blocked to prevent communication of required frames.

One conceivable approach to avoid such a circumstance is to verify a rule before applying a change of rules. That is, a frame input to and output from a firewall unit with a setup of a former rule before the change is recorded (captured), and a frame input to and output from a firewall unit with a setup of a new rule after the change is captured. The captured frames are compared to examine a change in traffic to be blocked. There is no problem if only an expectable change induced by the change of rules occurs. When unexpected traffic is blocked, however, there will be a problem with the setup of the new rule.

A storage device having a sufficient storage capacity or the like is required to capture frames input to and output from firewall units, and a large storage capacity for captured frames is required to capture all frames. Therefore, a storage device with a large capacity is required for a temporary purpose such as a change in firewall rules, resulting in an increase in cost or the like. It is unrealistic to capture all frames for rule verification.

On the other hand, only a small storage capacity is required to periodically capture part of frames for rule verification. However, it is difficult to inspect the blocking of traffic at the time when no frames are captured, and the correctness of the set new rule is not verified.

SUMMARY

Accordingly, it is an object of the present art to provide a rule verification apparatus and a rule verification method that allow easy and low-cost verification of the correctness of a rule for traffic control.

To achieve the above-described object, in an aspect, the present art provides a rule verification apparatus for examining a change in traffic due to a difference between rules for controlling traffic. The apparatus includes an obtaining part for obtaining a first group of frames that is obtained by applying a first rule to a flow of traffic corresponding to a transaction, and obtaining a second group of frames that is obtained by applying a second rule to the flow; a monitoring part for referring to the first group of frames and second group of frames obtained by the obtaining part, and monitoring a start and end of the flow to which each of the first and second rules is applied; holding part for holding the first group of frames and second group of frames obtained by the obtaining part; and an abandoning part for comparing the first group of frames and second group of frames held by the holding part when the monitoring part detects the end of the flow from the first group of frames and the end of the flow from the second group of frames, and abandoning the first group of frames and the second group of frames when there is no difference between the first group of frames and the second group of frames.

In another aspect, the present art provides a rule verification method for examining a change in traffic due to a difference between rules for controlling traffic. The method includes an obtaining step of obtaining a first group of frames that is obtained by applying a first rule to a flow of traffic corresponding to a transaction, and obtaining a second group of frames that is obtained by applying a second rule to the flow; a monitoring step of referring to the first group of frames and second group of frames obtained in the obtaining step, and monitoring a start and end of the flow to which each of the first and second rules is applied; a holding step of holding the first group of frames and second group of frames obtained in the obtaining step; a comparing step of comparing the first group of frames and second group of frames held in the holding step when the end of the flow from the first group of frames and the end of the flow from the second group of frames are detected in the monitoring step; and an abandoning step of abandoning the first group of frames and the second group of frames when there is no difference between the first group of frames and the second group of frames.

According to the present art, a first group of frames that is obtained by applying a first rule to a flow of traffic corresponding to a transaction, and a second group of frames that is obtained by applying a second rule to the flow are obtained; the obtained first group of frames and second group of frames are referred to, and monitoring the start and end of the flow to which each of the first and second rules is applied; the obtained first group of frames and second group of frames are held; the held first group of frames and second group of frames are compared when the end of the flow is detected from the first group of frames and the end of the flow is detected from the second group of frames; and the first group of frames and the second group of frames are abandoned when there is no difference between the first group of frames and the second group of frames. Therefore, all frames are captured for each rule applied, and captured frame groups are compared when all frames in a flow corresponding to a single transaction are obtained for the respective rules. The frame groups are abandoned if they coincide with each other. Therefore, only a frame groups that are not abandoned are inspected to provide a comprehensive analysis of an influence of the difference between the rules on flows, and frame groups for a flow in which there is no difference in all captured frames are abandoned, resulting in no increase in the required storage capacity. As a consequence, the correctness of a rule for traffic control can be easily verified at low cost.

BRIEF DESCRIPTION OF THE DRAWINGS

FIG. 3 is a diagram showing an example of a flow management table according to the first embodiment;

FIG. 4 is a diagram showing an example of captured information according to the first embodiment;

FIG. 7 is a diagram showing an example of a flow management table according to the second embodiment;

DESCRIPTION OF THE PREFERRED EMBODIMENTS

Embodiments will be described in detail hereinafter with reference to the drawings. In the following description, traffic control will be described in the context of a firewall. However, the present art can also be used for any application of rule verification such as a load distribution apparatus for distributing and transmitting a processing request to equalize the processing load of a plurality of servers.

First Embodiment

Figure 1:
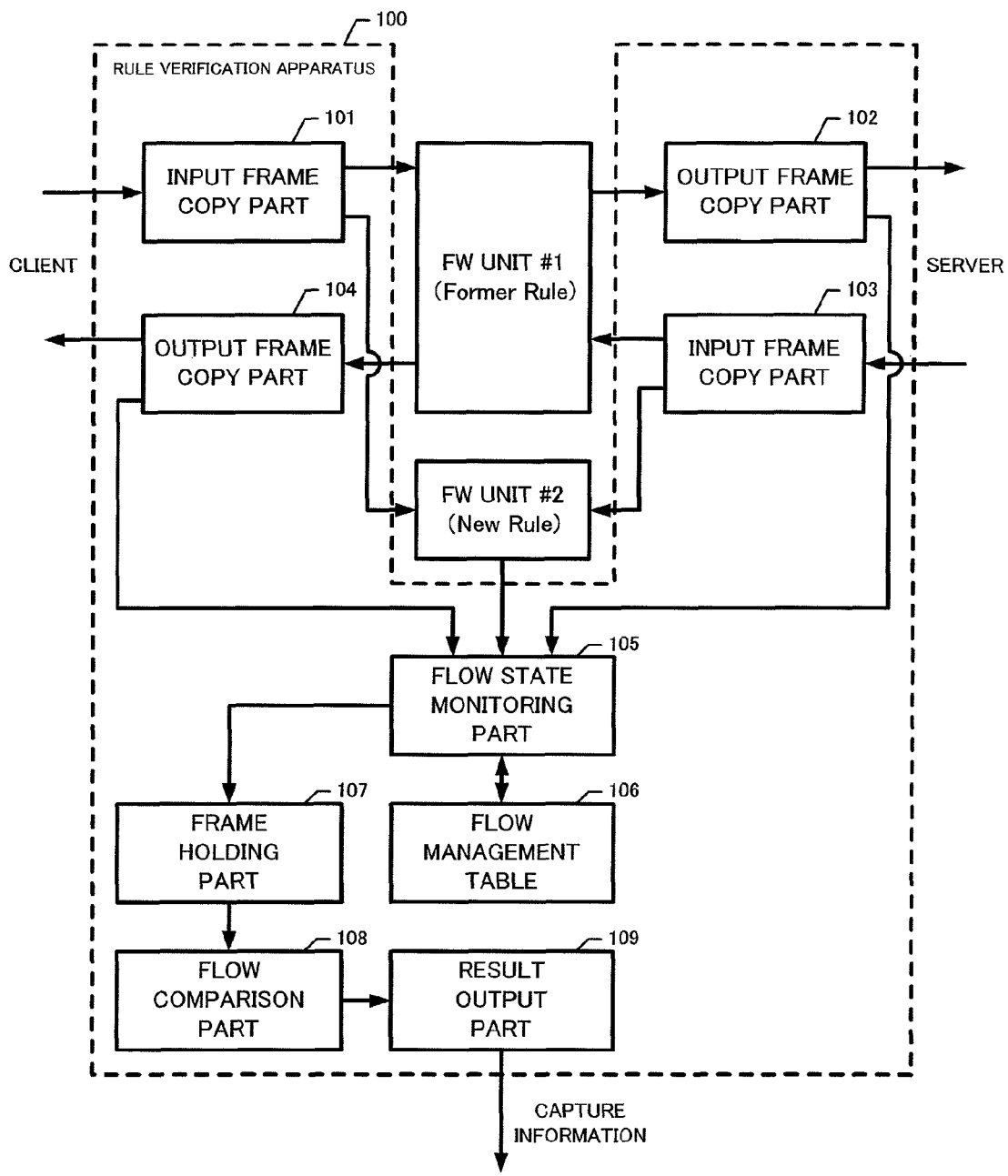
FIG. 1 is a block diagram showing the structure of a main portion of a rule verification apparatus according to a first embodiment.

FIG. 1 is a block diagram showing the structure of a main portion of a rule verification apparatus 100 according to a first embodiment. The rule verification apparatus 100 shown in FIG. 1 includes an input frame copy part 101, an output frame copy part 102, an input frame copy part 103, an output frame copy part 104, a flow state monitoring part 105, a flow management table 106, a frame holding part 107, a flow comparison part 108, and a result output part 109.

The rule verification apparatus 100 according to the first embodiment is placed between a server and firewall units (hereinafter referred to as "FW units") and between a client and the FW units. Frames transmitted from the server and the client are input to the FW units via the rule verification apparatus 100, and frames output from the FW units are received by the server and the client via the rule verification apparatus 100. In the first embodiment, it is assumed that an FW unit #1 with a setup of a former rule is running and an FW unit #2 with a setup of a new rule is to be verified.

The input frame copy part 101 copies a frame transmitted from the client to create another frame, which are the same as the frame, and inputs the frames to the FW units #1 and #2.

The output frame copy part 102 copies a frame output from the FW unit #1 to create another frame, which are the same as the frame, and outputs the frames to the server and the flow state monitoring part 105.

The input frame copy part 103 copies a frame transmitted from the server to create another frame, which are the same as the frame, and inputs the frames to the FW units #1 and #2.

The output frame copy part 104 copies a frame output from the FW unit #1 to create another frame, which are the same as the frame, and outputs the frames to the client and the flow state monitoring part 105.

Frames according to the first embodiment are communicated within a flow corresponding to a single transaction, and each flow is composed of transmission and reception of a plurality of frames between the server and the client. That is, in communication via a common protocol such as Transmission Control Protocol (TCP), a plurality of frames is exchanged during a sequence of flow events shown in FIG. 2, and a single transaction is carried out.

Figure 2:
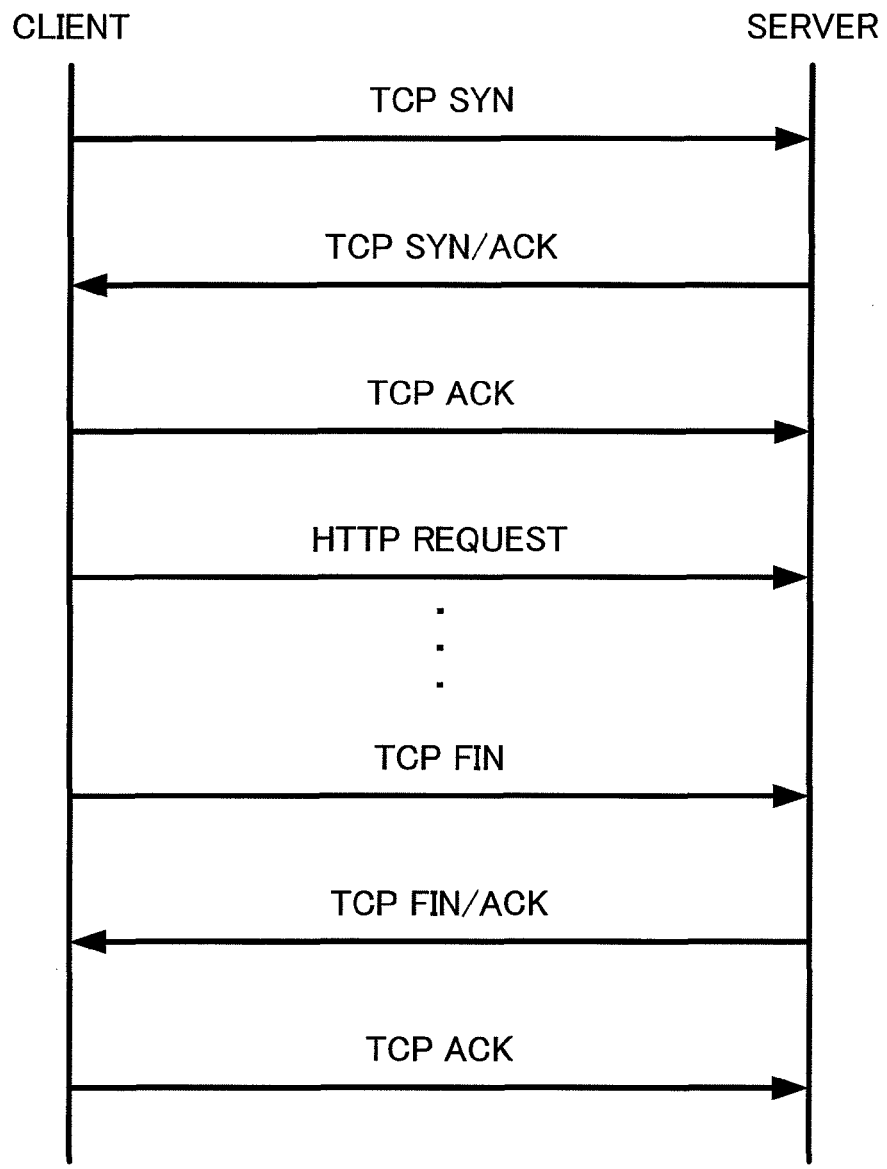
FIG. 2 is a diagram showing an example of a flow according to the first embodiment.

In an example shown in FIG. 2, when a "TCP SYN" frame indicating the start of a flow is transmitted from the client to the server, response acknowledgement frames called ACK frames are exchanged between the server and the client, and then a "Hypertext Transfer Protocol (HTTP) request" frame is transmitted from the client to the server. At the end of the flow, a "TCP FIN" frame indicating the end of the flow is transmitted from the client to the server, and the flow ends after ACK frames are exchanged. A single transaction is carried out by such a flow, and frames within the flow are closely related to one another. If one of the frames is abandoned, this influences the overall flow; however, this has substantially no direct influence on the other flows.

The flow state monitoring part 105 obtains a frame that is output from the FW unit #2 by applying the new rule, and the frame output from the output frame copy part 102 or 104, and outputs the obtained frames to the frame holding part 107. The flow state monitoring part 105 uses the obtained frames to monitor a flow state to which each of the former and new rules is applied. Upon obtaining a frame, the flow state monitoring part 105 searches the flow management table 106 for an entry of a flow to which the frame belongs. If the entry already exists, the flow state monitoring part 105 renews the state of the flow according to the content of the frame.

Specifically, if the frame is a start frame indicating the start of a flow, the flow state monitoring part 105 renews the state of the flow to an "in-connection" state. If the frame is an end frame indicating the end of a flow, the flow state monitoring part 105 renews the state of the flow to an "end" state. In this case, the flow state monitoring part 105 identifies which of the former and new rules is applied to the flow according to whether the frame is output from the output frame copy part 102 or 104 or from the FW unit #2, and renews the flow state.

If the entry of the flow to which the frame belongs is not registered in the flow management table 106, the flow state monitoring part 105 generates a new entry, and renews the state of the flow in a manner similar to that when the entry already exists. The flow state monitoring part 105 may identify the entry by referring to the IP addresses and port numbers of the server and client, which are stored in the header of the frame.

When a flow associated with any of the entries in the flow management table 106 is set to the "end" state for both the former and new rules, the flow state monitoring part 105 notifies the frame holding part 107 of the end of the flow.

The flow management table 106 has entries each associated with a flow, which are registered by the flow state monitoring part 105, in which a flow state through the FW unit #1 using the former rule and a flow state through the FW unit #2 using the new rule are managed. Specifically, for example, as shown in FIG. 3, the flow management table 106 stores the IP addresses and port numbers of the client and the server for every flow in association with the flow states through the FW unit #1 using the former rule and the FW unit #2 using the new rule. The flow management table 106 stores the "non-connection", "in-connation", or "end" state as a flow state corresponding to each FW unit.

The frame holding part 107 holds the frame output from the flow state monitoring part 105 as captured information. Specifically, as shown in FIG. 4, for example, the frame holding part 107 distinguishes frames output from the FW unit #1 from frames output from the FW unit #2, and holds the receiving times of frames for each flow and the data of the frames. The frame holding part 107 therefore holds two captured information item, namely, a captured information item corresponding to the FW unit #1 and a captured information item corresponding to the FW unit #2, for each of the entries in the flow management table 106. Upon receiving the notice of the end of a flow from the flow state monitoring part 105, the frame holding part 107 outputs the two captured information items concerning the flow to the flow comparison part 108.

The flow comparison part 108 compares the two captured information items output from the frame holding part 107, and abandons those captured information items if the group of frames output from the FW unit #1 and the group of frames output from the FW unit #2 completely coincide with each other. That is, if the flow does not change between when the former rule is applied and when the new rule is applied, the flow comparison part 108 abandons the captured information concerning the flow.

If there is a difference between the group of frames output from the FW unit #1 and the group of frames output from the FW unit #2, the flow comparison part 108 outputs those captured information items to the result output part 109. That is, if the flow changes between when the former rule is applied and when the new rule is applied, the flow comparison part 108 outputs the two captured information items concerning the flow to the result output part 109. For example, in the example of captured information shown in FIG. 4, frame 4 is output from the FW unit #1 using the former rule, but is not output from the FW unit #2 using the new rule. Therefore, the flow comparison part 108 outputs two captured information items concerning the flow associated with entry 1 to the result output part 109.

The flow comparison part 108 compares captured information items by, for example, comparing binary patterns of frames in a time-series manner or comparing TCP sequence numbers.

The result output part 109 outputs the captured information output from the flow comparison part 108 to, for example, an external analysis terminal. That is, the result output part 109 outputs, to the outside, data of all frames within a flow in which the output frame changes between when the former rule is applied and when the new rule is applied. Therefore, if there is a difference between a frame output when the former rule is applied and a frame output when the new rule is applied, all frames in the flow including the frame are output to the outside.

Figure 5:
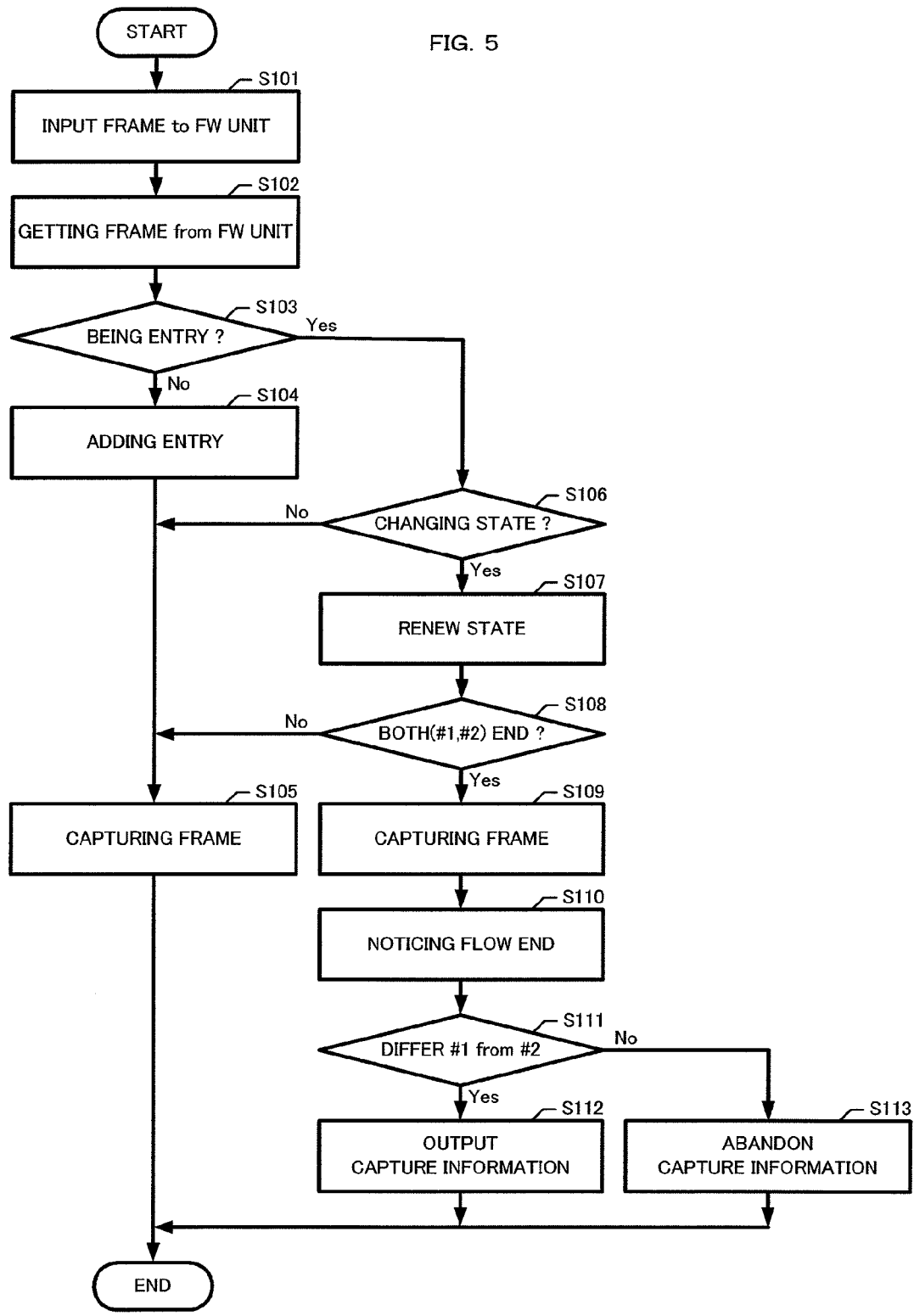
FIG. 5 is a flowchart showing a verification operation according to the first embodiment.

Next, the verification operation of the rule verification apparatus 100 having the above-described structure will be described with reference to a flowchart shown in FIG. 5.

First, when a frame is transmitted from the client or the server, the frame is copied by the input frame copy part 101 or 103, and is input to the FW units #1 and #2 (step S101). The frame to which the former rule is applied by the FW unit #1 is output to the output frame copy part 102 or 104 for copying, and is output to the flow state monitoring part 105. The frame to which the new rule is applied by the FW unit #2 is also output to the flow state monitoring part 105. Therefore, the flow state monitoring part 105 obtains the frame passing through both the FW units #1 and #2 (step S102).

When the flow state monitoring part 105 obtains a frame, the flow state monitoring part 105 searches the flow management table 106, and determines whether or not an entry associated with the obtained frame exists (step S103). The flow state monitoring part 105 refers to the header of the obtained frame to obtain the IP addresses and port numbers of the server and the client, and determines whether or not an entry matching the IP addresses and the port numbers is already registered in the flow management table 106.

As a result of the determination, if the entry is not registered (No in step S103), the flow state monitoring part 105 adds a new entry to the flow management table 106 (step S104), and renews the flow state corresponding to the FW unit from which the frame is output to the "in-connection" state. For example, when an entry associated with the frame output from the FW unit #1 is added, the flow state corresponding to the FW unit #1 is set to the "in-connection" state, and the flow state corresponding to the FW unit #2 is set to the "non-connection" state.

Further, the frame obtained by the flow state monitoring part 105 is output to the frame holding part 107, and the frame holding part 107 holds, as captured information, the data of the frame and the receiving time of the frame in association with each other (step S105). The captured information includes an identification number of the new entry added to the flow management table 106 and information indicating from which of the FW units #1 and #2 the frame is output.

As a result of the search for the entry by the flow state monitoring part 105, if the entry is already registered (Yes in step S103), the flow state monitoring part 105 refers to the content of the frame, and determines whether or not the state of the flow has changed (step S106). As a result of the determination, if the state of the flow has not changed (No in step S106), the frame is output to the frame holding part 107, and is held as captured information (step S105). If captured information of a preceding frame output from the same FW unit within the same flow is already held in the frame holding part 107, the current frame is held in the form added to the previous captured information.

If the state of the flow has changed (Yes in step S106), the flow state monitoring part 105 renews the flow state stored in the flow management table 106 (step S107). That is, if a change in the flow state is detected on the basis of the frame output from the FW unit #1, the state for the FW unit #1 in the entry associated with the flow is renewed. If a change in the flow state is detected on the basis of the frame output from the FW unit #2, the state for the FW unit #2 in the entry associated with the flow is renewed.

Then, the flow state monitoring part 105 refers to the entry in which the state is renewed, and determines whether or not the flow states corresponding to both the FW units #1 and #2 are set in the "end" state (step S108). If the flow for both FW units has not ended (No in step S108), the frame is output to the frame holding part 107 and is held as captured information (step S105). If captured information of a preceding frame output from the same FW unit within the same flow is already held in the frame holding part 107, the current frame is held in the form added to the previous captured information.

If the flow states corresponding to both FW units are set in the "end" state (Yes in step S108), the frame is also output to the frame holding part 107 and is held as captured information (step S109). Since the flow has ended, it is expected that captured information of a preceding frame output from the same FW unit within the same flow is already held in the frame holding part 107, and the current frame is held in the form added to the previous captured information. If flow states corresponding to both FW units are set in the "end" state, the flow state monitoring part 105 notifies the frame holding part 107 of the end of the flow (step S110).

Upon receiving the notice of the end of the flow, the frame holding part 107 outputs the two captured information items concerning the flow that has ended to the flow comparison part 108. That is, when the frame holding part 107 is notified of the end of a flow, the flow states corresponding to both the FW units #1 and #2 are set in the "end" state. Therefore, the captured information items corresponding to the FW units #1 and #2 are output to the flow comparison part 108. Accordingly, captured information concerning a flow that has ended is sequentially output to the flow comparison part 108, and the frame holding part 107 does not require a large storage capacity. The frame holding part 107 only requires a storage capacity sufficient to hold all possible concurrent frames within a flow.

When the captured information items are output to the flow comparison part 108, the flow comparison part 108 compares the two captured information items, and determines whether or not there is a difference between the groups of frames held for the same flow (step S111). As a result of the determination, if there is a difference between the groups of frames (Yes in step S111), this means that the groups of frames output from the FW units #1 and #2 for the same flow are different, and it is determined that the flow has an influence due to the change of rules. Then, the captured information concerning the overall flow is output to the outside via the result output part 109 (step S112).

Accordingly, when a difference occurs within a flow due to the change of rules, captured information concerning the overall flow rather than only a different frame is output to the outside. Therefore, it can be checked whether or not an expectable difference has occurred due to the change of rules, and when an unexpected difference occurs, the cause can be investigated while taking account of the influence of the other frames being blocked within the flow.

As a result of the comparison of captured information, if there is no difference between the groups of frames (No in step 111), the flow comparison part 108 abandons the captured information items (step S113). That is, if the groups of frames output for the same flow from the FW units #1 and #2 coincide with each other, it can be determined that the flow is not influenced by the change of rules, and the captured information items including all the frames within the flow are abandoned.

Therefore, unnecessary captured information is abandoned as a result of the comparison performed by the flow comparison part 108, leading to no increase in the required storage capacity. Further, captured information for a different frame is also output to the outside from the result output part 109 and is not left in the rule verification apparatus 100, leading to no increase in the required storage capacity.

According to the first embodiment, therefore, the state of a flow is monitored using a frame output from an FW unit with a setup of a new rule and a frame output from an FW unit with a setup of a former rule, and a group of frames to which the new rule is applied and a group of frames to which the former rule is applied are captured for each flow. When the flow states corresponding to the new and former rules are set to the end state, groups of frames for the flow each group being captured for each of the rules are compared. If there is a difference between the groups of frames, the groups of frames are output to the outside, whereas if there is no difference, the groups of frames are abandoned. Thus, for a flow in which no difference occurs between output groups of frames due to the change of rules, the groups of frames are abandoned immediately after the flow has ended, and there is no need to store a large number of frames. A large storage capacity is not required to examine a difference in output frames due to the difference between the rules. Therefore, the correctness of a rule for traffic control can be easily verified at low cost.

Second Embodiment

A feature of a second embodiment is that the occurrence of a time-out is detected when an appointed time has passed since a preceding frame was output from an FW unit, and the detected time-out is regarded as the end of the flow.

Figure 6:
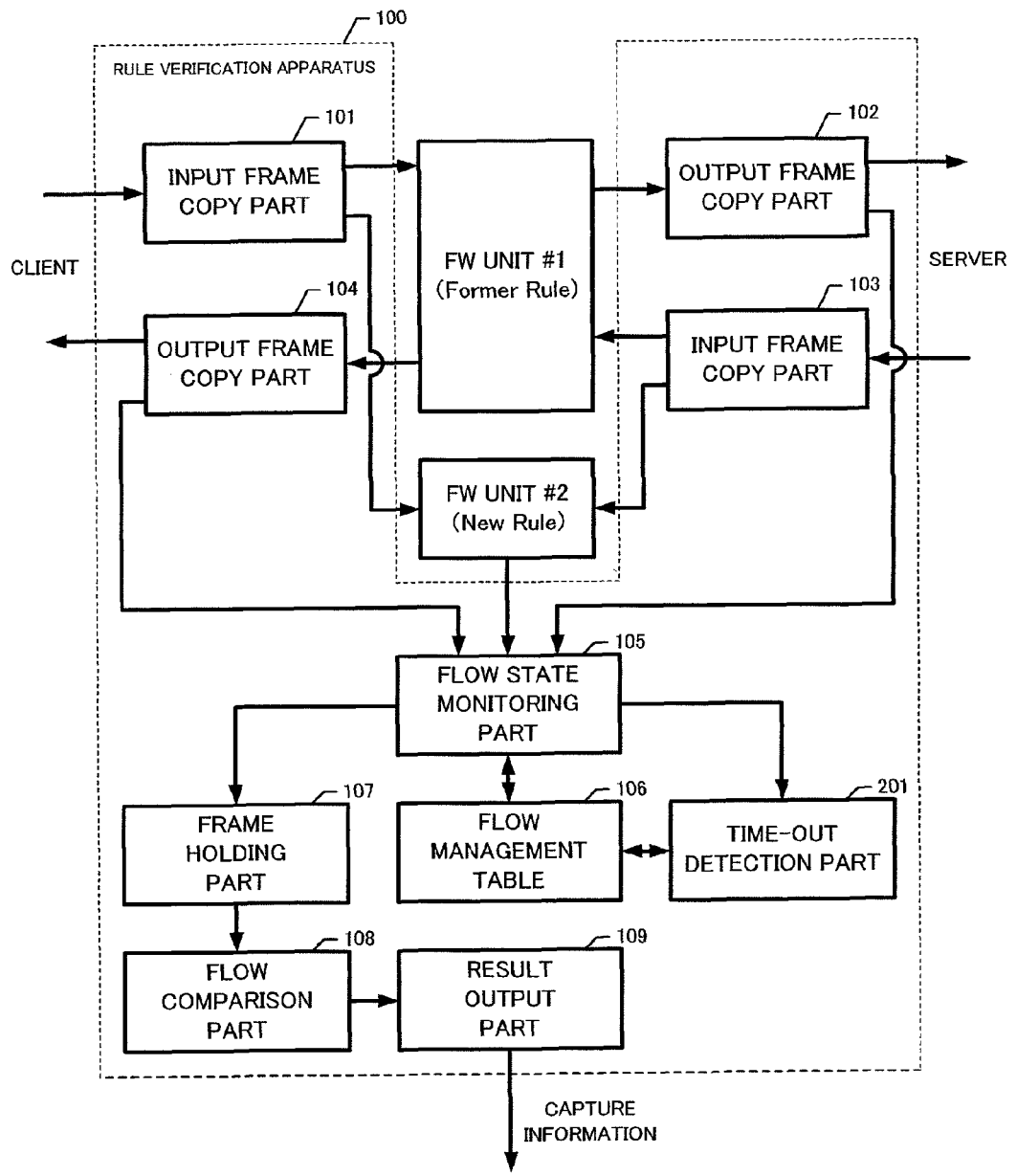
FIG. 6 is a block diagram showing the structure of a main portion of a rule verification apparatus according to a second embodiment.

FIG. 6 is a block diagram showing the structure of a main portion of a rule verification apparatus 100 according to the second embodiment. In FIG. 6, the same parts as those shown in FIG. 1 are represented by the same reference numerals, and a description thereof is omitted. The rule verification apparatus 100 shown in FIG. 6 has a structure in which a time-out detection part 201 is added to the rule verification apparatus 100 shown in FIG. 1.

The time-out detection part 201 records receiving times at which the flow state monitoring part 105 obtains frames for every flow and every FW unit. If a subsequent frame is not obtained when an appointed time has passed since a preceding frame was obtained, the time-out detection part 201 detects a time-out, and renews in the flow management table 106 the state of the flow in which the time-out is detected. That is, for example, as shown in FIG. 7, the time-out detection part 201 renews an FW unit state of a flow in which a time-out is detected to a "time-out (TO)" state indicating the occurrence of a time-out. In FIG. 7, the state corresponding to the FW unit #2 for the flow associated with entry 2 is renewed to the "TO" state.

Figure 8:
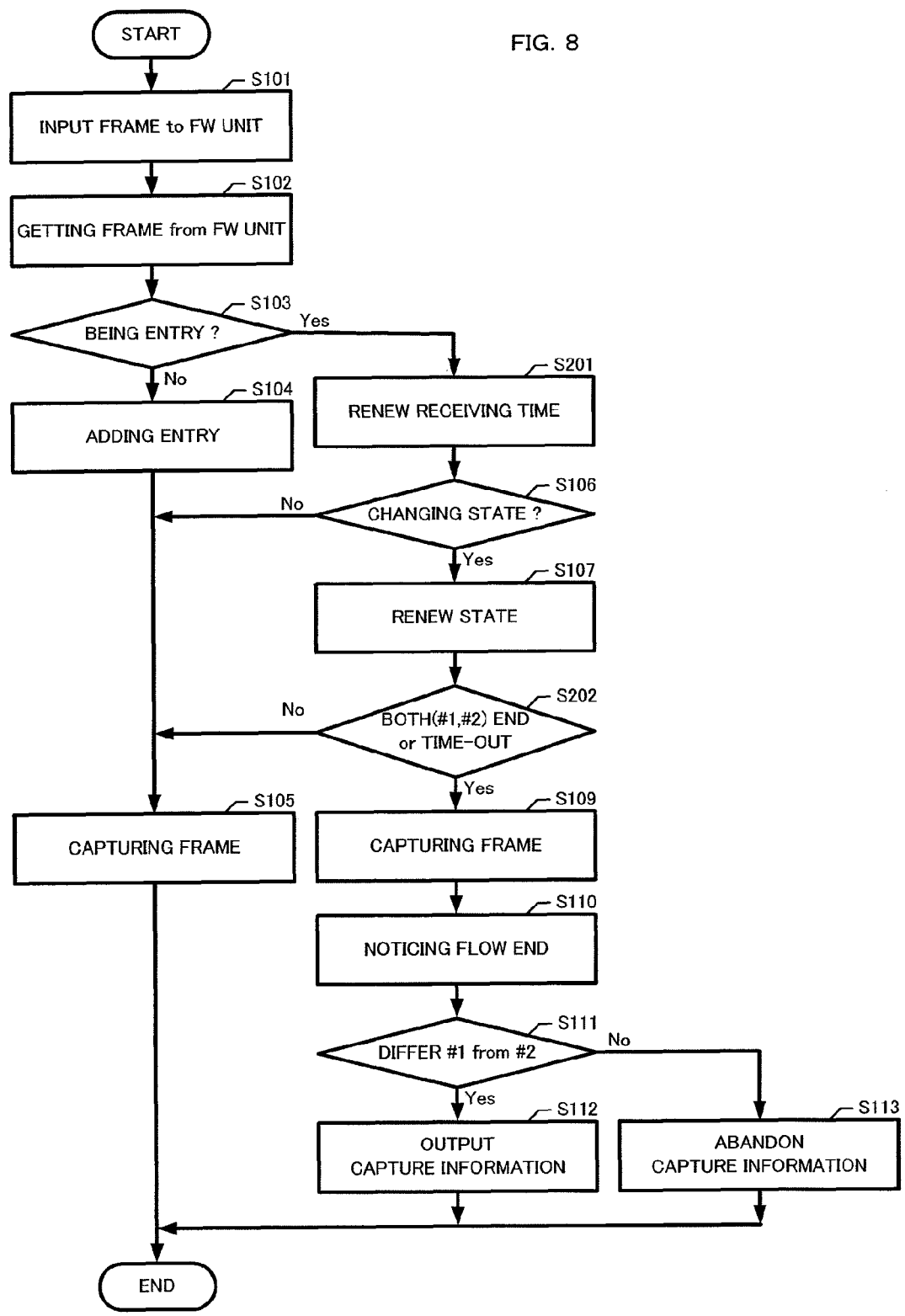
FIG. 8 is a flowchart showing a verification operation according to the second embodiment.

Next, the verification operation of the rule verification apparatus 100 having the above-described structure will be described with reference to a flowchart shown in FIG. 8. In FIG. 8, the same steps as those shown in FIG. 5 are represented by the same reference numerals, and a detailed description thereof is omitted.

First, a frame transmitted from the client or server is copied by the input frame copy part 101 or 103, and is input to the FW units #1 and #2 (step S101). The frames output from the FW units #1 and #2 are obtained by the flow state monitoring part 105 (step S102). When the flow state monitoring part 105 obtains a frame, the flow management table 106 is searched for an entry associated with the obtained frame (step S103).

As a result of the search, if the entry is not registered (No in step S103), as in the first embodiment, a new entry is added to the flow management table 106 (step S104). Then, the flow state is renewed to the "in-connection" state, and the frame holding part 107 holds the frame as captured information (step S105). In the second embodiment, the time-out detection part 201 records the receiving time at which the flow state monitoring part 105 obtains the frame for every flow and every FW unit from which the frame is output.

As a result of the search for the entry by the flow state monitoring part 105, if the entry is already registered (Yes in step S103), the time-out detection part 201 is notified of the receiving time of the frame, and the receiving time recorded in the time-out detection part 201 is renewed (step S201). At the same time, the flow state monitoring part 105 refers to the content of the frame, and determines whether or not the state of the flow has changed (step S106). If the state of the flow has not changed (No in step S106), the frame is held by the frame holding part 107 (step S105). If the state of the flow has changed (Yes in step S106), the flow state monitoring part 105 renews the flow state stored in the flow management table 106 (step S107).

Then, the flow state monitoring part 105 refers to the entry in which the state is renewed, and determines whether or not the flow states corresponding to both the FW units #1 and #2 are set in the "end" or "TO" state (step S202). In the second embodiment, the time-out detection part 201 detects a time-out at any time. When a time-out is detected, the state of the corresponding flow is renewed to the "TO" state, and the flow in which the time-out has occurred is regarded as being equivalent to a flow that has ended. A time-out detection process is described in detail below. If it is determined by the flow state monitoring part 105 that the flow states corresponding to both FW units are not set in the end or TO state (No in step S202), the frame is held by the frame holding part 107 (step S105).

If the flow states corresponding to both FW units are set in the end or TO state (Yes in step S202), the frame is also held by the frame holding part 107 (step S109). At the same time, the flow state monitoring part 105 notifies the frame holding part 107 of the end of the flow (step S110).

Upon receiving the notice of the end of the flow, the frame holding part 107 outputs the two captured information items concerning the flow that has ended to the flow comparison part 108. When the captured information items are output to the flow comparison part 108, the flow comparison part 108 compares the two captured information items, and determines whether or not there is a difference between the groups of frames held for the same flow (step S111). As a result of the determination, if there is a difference between the groups of frames (Yes in step S111), the captured information concerning the overall flow is output to the outside via the result output part 109 (step S112). As a result of the comparison of captured information, if there is no difference between the groups of frames (No in step S111), the flow comparison part 108 abandons the captured information items (step S113).

Figure 9:
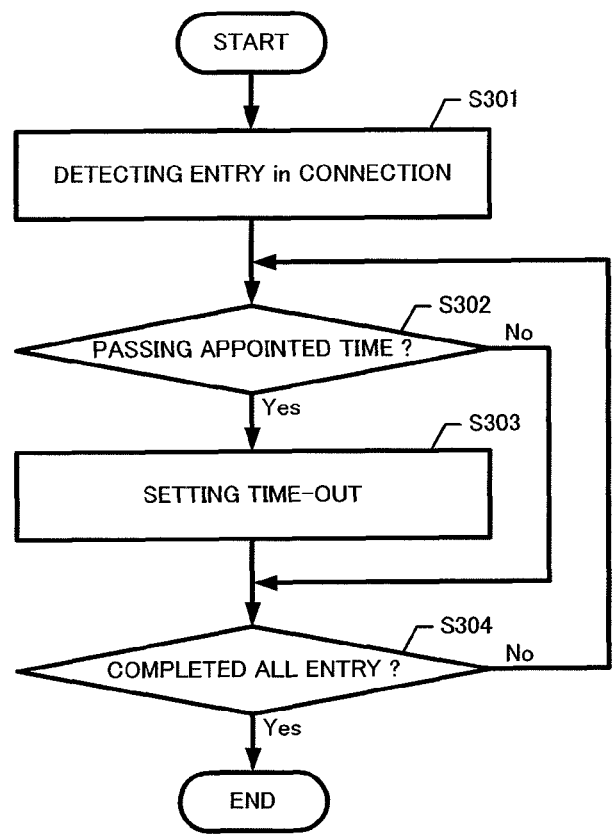
FIG. 9 is a flowchart showing a time-out detection process according to the second embodiment.

A time-out detection process according to the second embodiment will be described with reference to a flowchart shown in FIG. 9. The time-out detection process is periodically performed by the time-out detection part 201. Each time the flow state monitoring part 105 obtains a frame, the receiving time of the frame is recorded in the time-out detection part 201 for every flow and every FW unit from which the frame is output.

At the time when the time-out detection process is performed, the time-out detection part 201 detects an entry including the "in-connection" state from the flow management table 106 (step S301). The flow set in the in-connection state in the flow management table 106 is a flow whose end frame indicating the end of the flow has not been obtained by the flow state monitoring part 105. Since the time passed since the preceding frame was obtained is not identifiable from the flow management table 106, the time-out detection part 201 obtains the latest receiving time for the corresponding flow and FW unit, and determines whether or not an appointed time (e.g., one minute) has passed since the obtained receiving time (step S302).

As a result of the determination, if the appointed time has passed since the latest frame receiving time (Yes in step S302), the time-out detection part 201 determines that a time-out has occurred for the flow through the corresponding FW unit, and renews the state stored in the flow management table 106 from the "in-connection" state to the "TO" state (step S303). Then, the time-out detection part 201 determines whether or not the process has been completed for all detected entries including the "in-connection" state (step S304). If the process has not yet been completed, the determination as to whether or not the appointed time has passed since the previous receiving time is repeated for each flow and each FW unit.

If the appointed time has not passed since the latest frame receiving time (No in step S302), it is determined that no time-out has occurred, and an operation similar to that described above is repeated until the process has been completed for all the detected entries including the "in-connection" state.

In the second embodiment, therefore, if a period of time during which no frames are output from an FW unit exceeds an appointed time, it is determined that a time-out has occurred in a flow for the FW unit, and the state stored in the flow management table 106 is renewed to the "TO" state. When the flow state monitoring part 105 checks the states stored in the flow management table 106 and the flow states corresponding to the FW units #1 and #2 is set in the "end" or "TO" state, it is determined that the flow has ended. This prevents a flow state from being recognized as being still in the in-connection state even though no response is made from the server or client and a time-out has occurred. The time-out is regarded as being equivalent to the end of the flow, and captured information can be output from the frame holding part 107. Therefore, captured information concerning a flow in which a time-out has occurred is not continuously stored more than necessary, thus reliably preventing an increase in the storage capacity.

According to the second embodiment, therefore, the latest frame receiving time is recorded for every flow and every FW unit. If a subsequent frame is not output from a FW unit when an appointed time has passed, it is determined that a time-out has occurred, and the processing is performed by regarding the time-out as being equivalent to the end of the flow. This allows captured information concerning a flow in which a time-out has occurred to be quickly abandoned or to be output to the outside, and can reliably reduce the storage capacity required to hold captured information.

Third Embodiment

A feature of a third embodiment is that a filter with a setup of conditions of flows under which captured information can be abandoned even if there is a difference as a result of the comparison of captured information is provided to prevent captured information more than necessary from being output to the outside.

Figure 10:
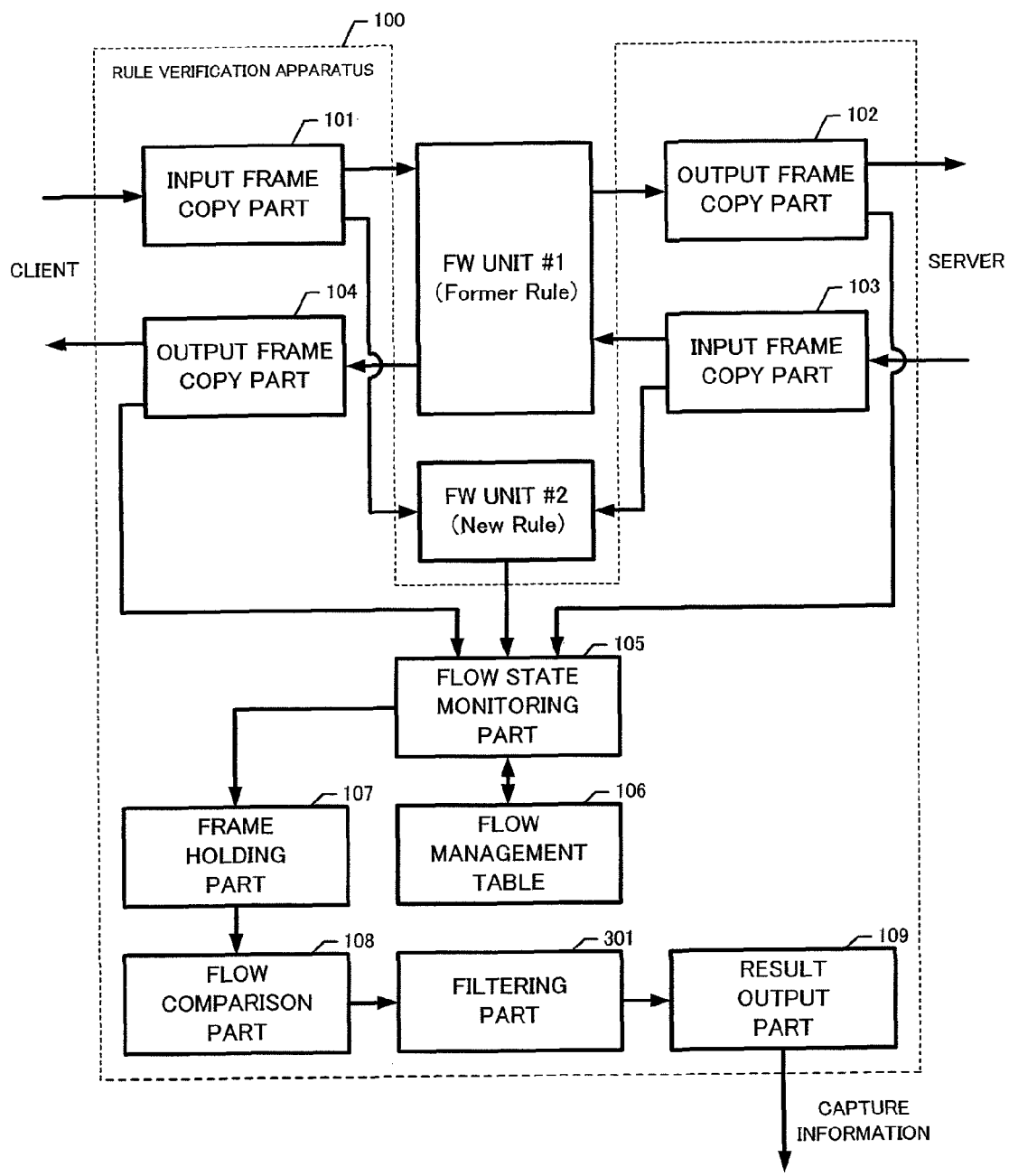
FIG. 10 is a block diagram showing the structure of a main portion of a rule verification apparatus according to a third embodiment.

FIG. 10 is a block diagram showing the structure of a main portion of a rule verification apparatus 100 according to the third embodiment. In FIG. 10, the same parts as those shown in FIG. 1 are represented by the same reference numerals, and a description thereof is omitted. The rule verification apparatus 100 shown in FIG. 10 has a structure in which a filtering part 301 is added to the rule verification apparatus 100 shown in FIG. 1.

The filtering part 301 pre-stores conditions of a flow not to be verified even if there is a difference as a result of comparison of captured information by the flow comparison part 108. When captured information is output from the flow comparison part 108, the filtering part 301 determines whether or not the output captured information meets the pre-stored conditions of flow. If the output captured information meets the conditions, the captured information is abandoned. That is, the filtering part 301 outputs only captured information that does not meet the pre-stored conditions of flow to the result output part 109.

The conditions stored in the filtering part 301 include, for example, a flow to be blocked by changing from the former rule to the new rule, and a flow in which a difference inevitably occurs as a result of the comparison of captured information by the flow comparison part 108. Specifically, a condition, e.g., an "HTTP request to be sent to http://www.fujitsu.com/extra/" is set in the filtering part 301. In this example, for a flow regarding an HTTP request to be sent to "http://www.fujitsu.com/extra/", the groups of frames output from the FW units #1 and #2 are abandoned by the filtering part 301 and are not output to the outside from the result output part 109 even if there is a difference between those groups of frames.

According to the third embodiment, therefore, a flow in which a difference between captured information items due to the change of rules is permitted is not output to the outside by filtering. Thus, only necessary captured information can be output to the outside, and the correctness of the change in rules can efficiently be verified.

In the third embodiment, when the filtering part 301 abandons captured information, an identifier of a flow corresponding to the abandoned captured information and the flow conditions stored in the filtering part 301 may be output to the outside via the result output part 109 so that the abandonment of captured information due to the filtering can be recognized.

Fourth Embodiment

A feature of a fourth embodiment is that when an FW unit performs address conversion, a rule verification apparatus also performs similar address conversion to accurately monitor the state of a flow.

Figure 11:
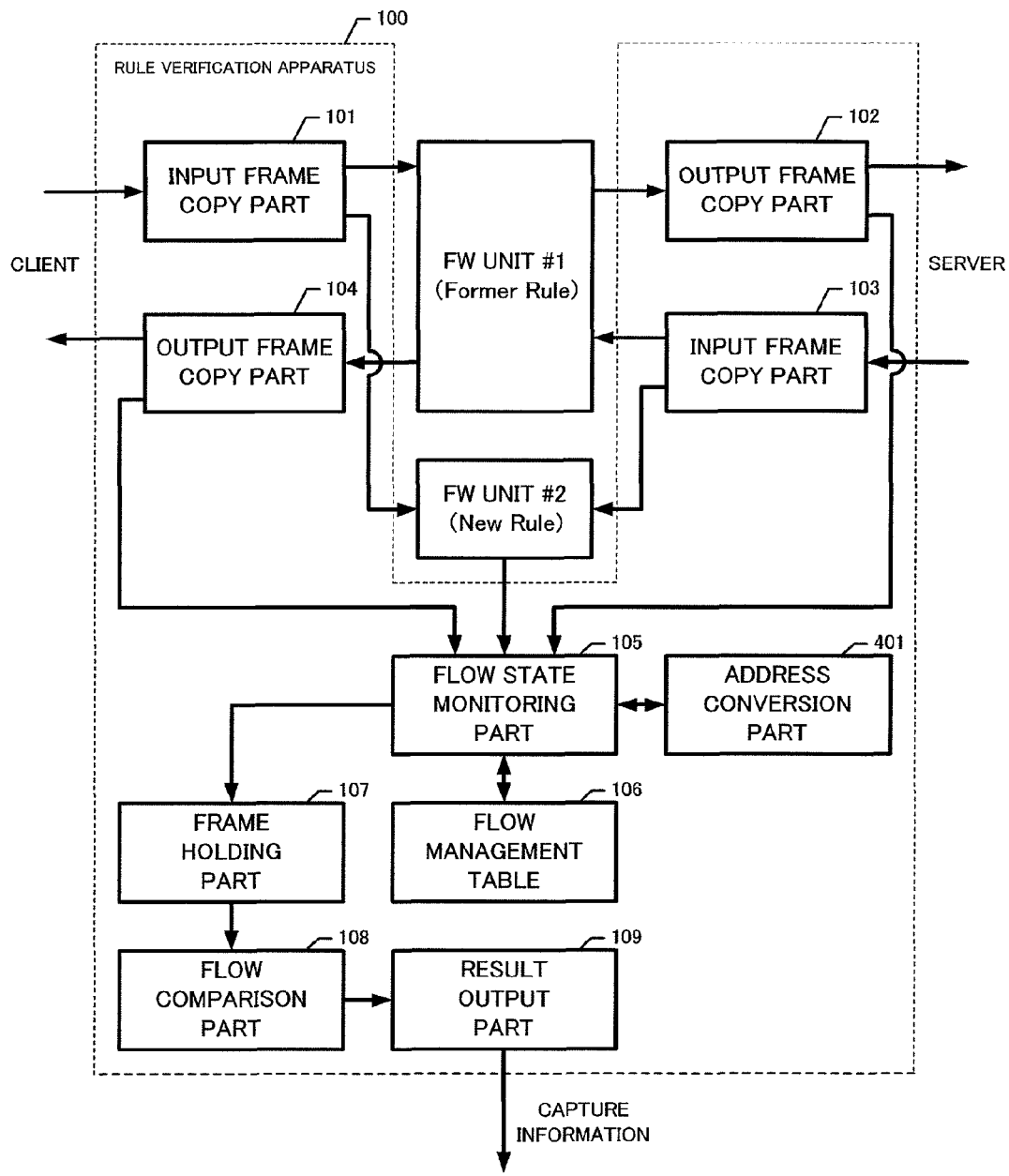
FIG. 11 is a block diagram showing the structure of a main portion of a rule verification apparatus according to a fourth embodiment.

FIG. 11 is a block diagram showing the structure of a main portion of a rule verification apparatus 100 according to the fourth embodiment. In FIG. 11, the same parts as those shown in FIG. 1 are represented by the same reference numerals, and a description thereof is omitted. The rule verification apparatus 100 shown in FIG. 11 has a structure in which an address conversion part 401 is added to the rule verification apparatus 100 shown in FIG. 1.

The address conversion part 401 converts an address of a frame obtained by the flow state monitoring part 105 using the same address conversion rule as that used for address conversion performed by the FW units #1 and #2. That is, when the flow state monitoring part 105 obtains a frame, the address conversion part 401 converts the IP addresses of the server and the client, which are stored in the header of the frame, and notifies the flow state monitoring part 105 of the converted addresses in a manner similar to that in an FW unit.

In the fourth embodiment, the FW units #1 and #2 perform address conversion, and it is assumed that the same server or client can have different addresses depending on the direction of communication. For example, when a frame is transmitted from a server having an IP address of "20.0.0.1" to a client, an FW unit converts the IP address of the source server into "30.0.0.1", and the client recognizes that the IP address of the server is "30.0.0.1". Thus, the IP address of the source server is "20.0.0.1" in communication from the server to the client while the IP address of the destination server is "30.0.0.1" in communication from the client to the server.

In this case, the conversion of the IP address causes the flow state monitoring part 105 to recognize different flows although the communication occurs within the same flow. In the fourth embodiment, the address conversion part 401 performs address conversion similar to that in an FW unit. Therefore, the state of the same flow can be appropriately monitored even if address conversion is performed.

According to the fourth embodiment, therefore, when an FW unit performs address conversion of a frame, address conversion similar to that in the FW unit is performed to monitor the state of a flow. Therefore, frames within the same flow can be accurately recognized regardless of the direction of communication, and the state of the flow can be accurately monitored.

Fifth Embodiment

A feature of a fifth embodiment is that in a protocol in which a control flow and a data flow separately occur, captured information items concerning all related flows are compared when all the related flows rather than one flow have ended.

In the fifth embodiment, for example, a protocol in which a control flow relating to control of data transfer and a data flow for transferring data are separately established, such as file transfer protocol (FTP), is assumed.

Figure 12:
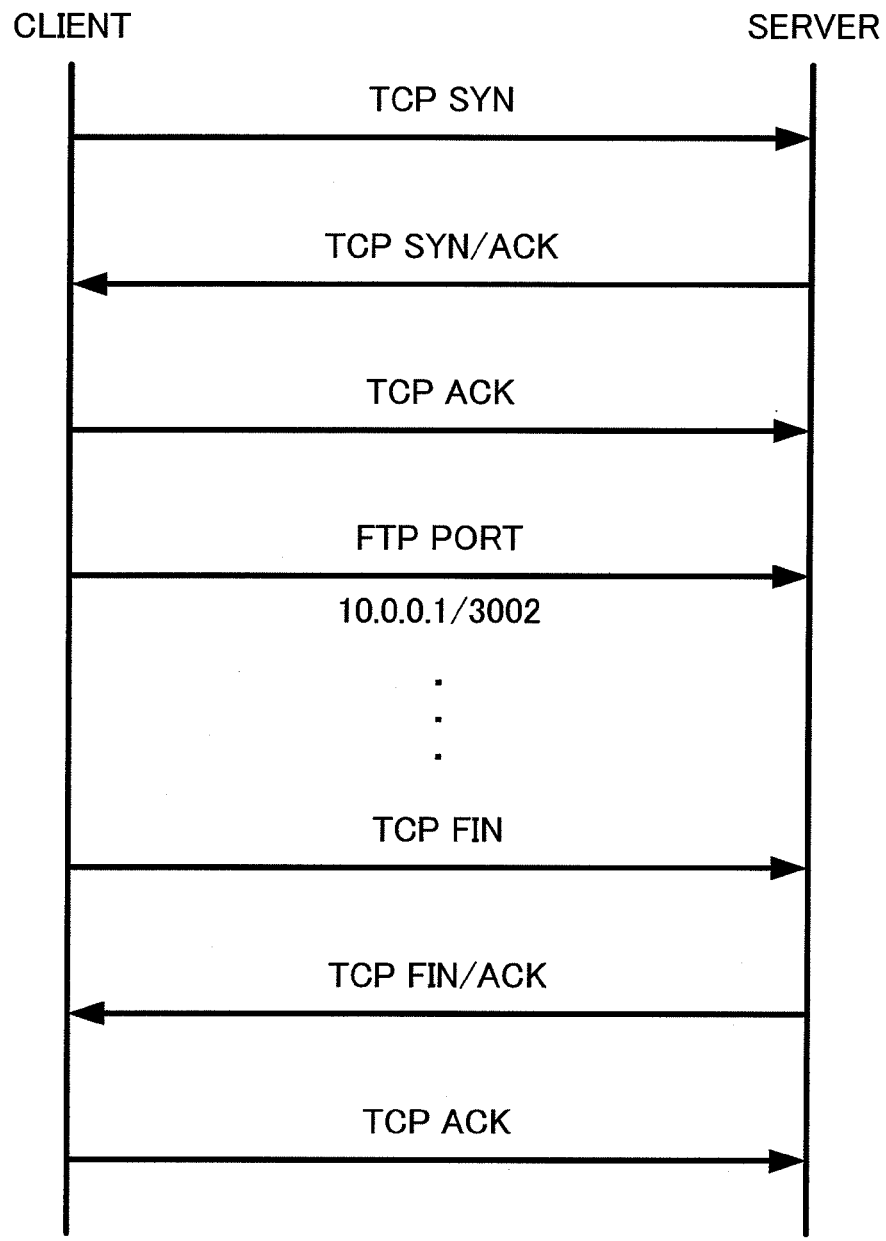
FIG. 12 is a diagram showing an example of a control flow according to a fifth embodiment.
Figure 13:
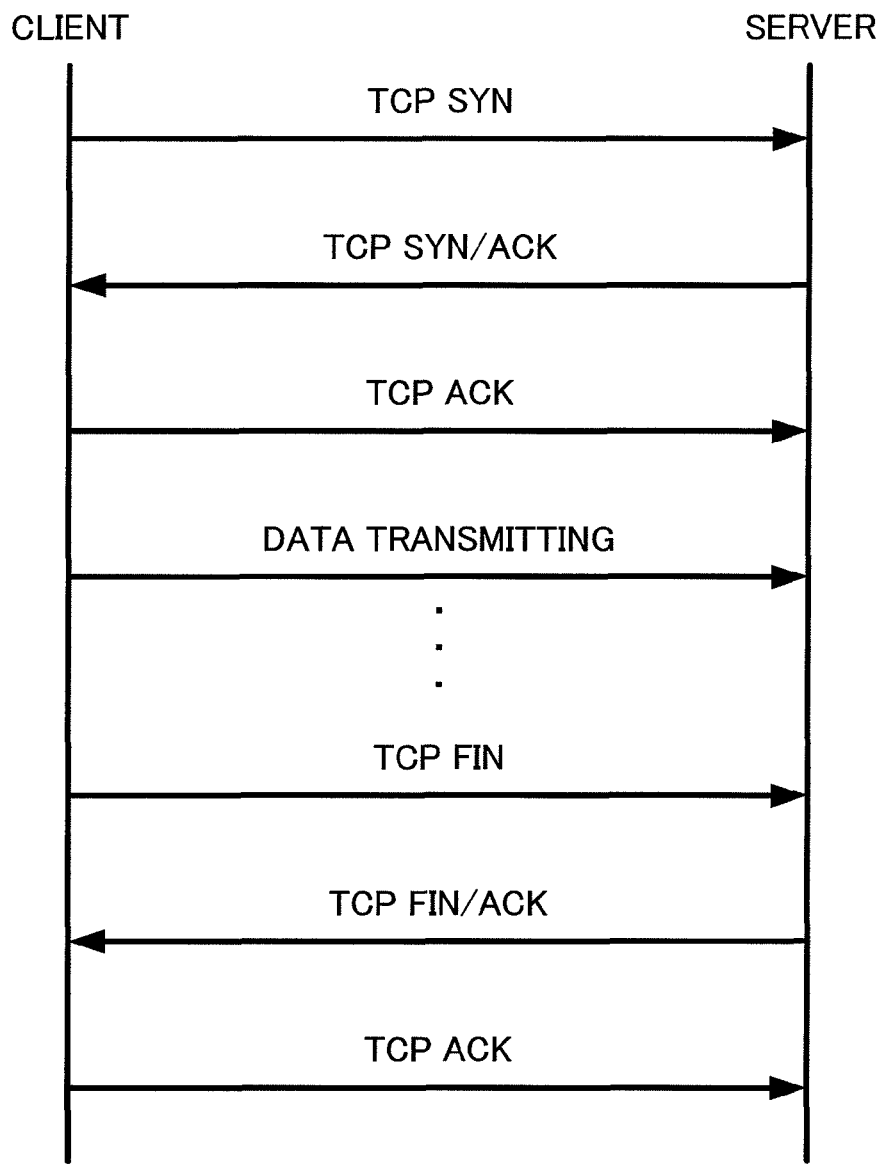
FIG. 13 is a diagram showing an example of a data flow according to the fifth embodiment.

Specifically, for example, as shown in FIG. 12, in the control flow, in addition to a start frame and an end frame such as a "TCP SYN" frame and a "TCP FIN" frame, an "FTP PORT" frame for controlling a port for data transfer is transmitted from the client to the server. In the data flow, for example, as shown in FIG. 13, in addition to a start frame and an end frame such as a "TCP SYN" frame and a "TCP FIN" frame, a data transfer frame for transferring actual data is transmitted from the client to the server. The control flow and the data flow are associated with each other. In some cases, a single control flow may involve a plurality of data flows.

Figure 14:
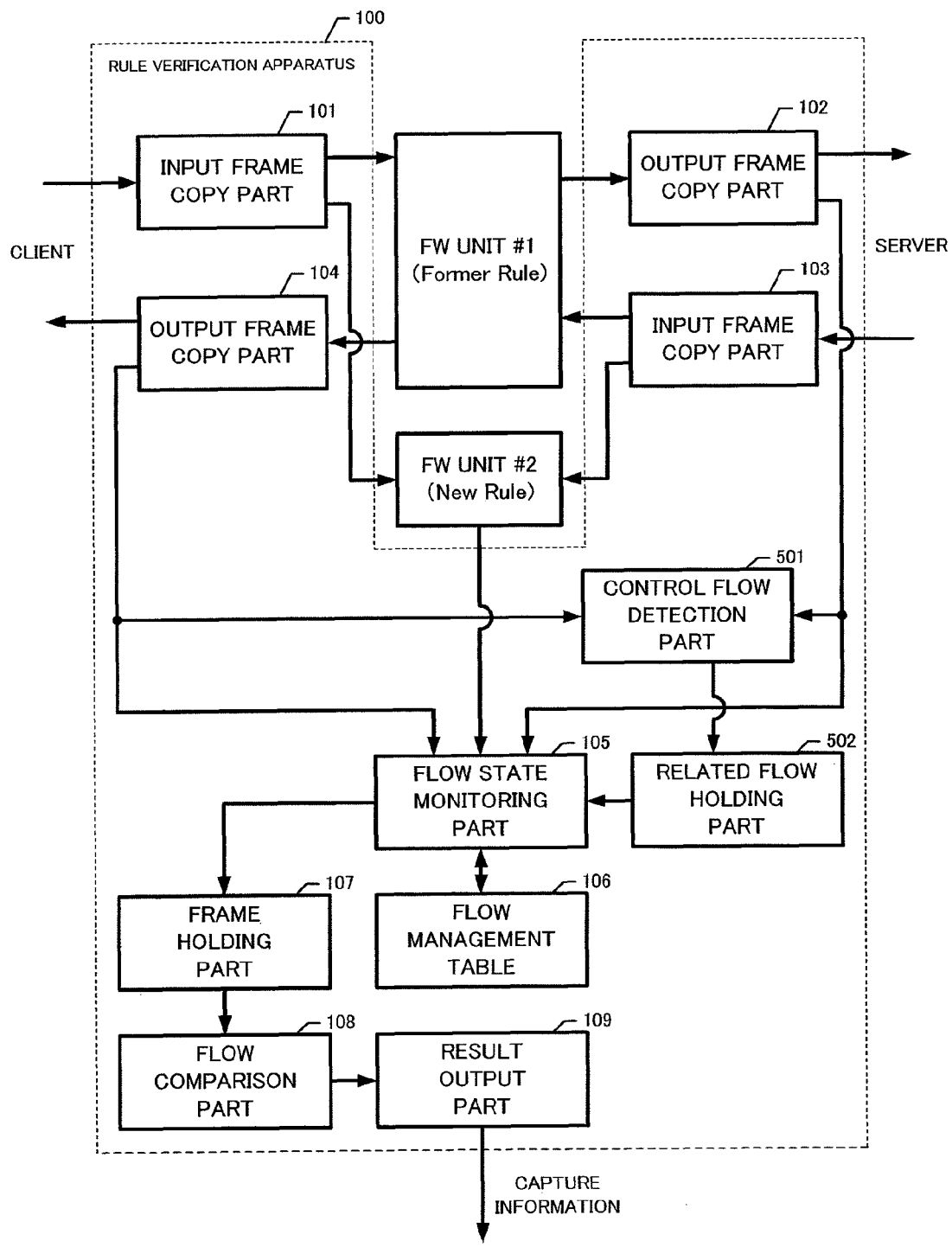
FIG. 14 is a block diagram showing the structure of a main portion of a rule verification apparatus according to the fifth embodiment.

FIG. 14 is a block diagram showing the structure of a main portion of a rule verification apparatus 100 according to the fifth embodiment. In FIG. 14, the same parts as those shown in FIG. 1 are represented by the same reference numerals, and a description thereof is omitted. The rule verification apparatus 100 shown in FIG. 14 has a structure in which a control flow detection part 501 and a related flow holding part 502 are added to the rule verification apparatus 100 shown in FIG. 1.

The control flow detection part 501 obtains a frame output from the output frame copy part 102 or 104, and detects the occurrence of a control flow. That is, the control flow detection part 501 detects a frame unique to a control flow, such as the "FTP PORT" frame described above, and detects the occurrence of a control flow. The control flow detection part 501 obtains an identifier of a data flow for data transfer controlled by the control flow, and notifies the related flow holding part 502 of the control flow and the related data flow. The control flow detection part 501 obtains an identifier of a related data flow from a frame such as a "FTP PORT" frame.

The related flow holding part 502 holds the identifiers of the control flow and related data flow notified by the control flow detection part 501.

In the fifth embodiment, if a flow that has ended for both the FW units #1 and #2 is found in the flow management table 106, the flow state monitoring part 105 refers to the related flow holding part 502 to check whether or not all related flows, i.e., a control flow and a data flow or flows, have ended. If all the related flows have not yet ended, the flow state monitoring part 105 does not notify the frame holding part 107 of the end of the flow. Only when all the related flows, i.e., the control flow and data flow or flows, have ended, the frame holding part 107 is notified of the end of all the flows.

Therefore, the frame holding part 107 holds frames of all related flows, i.e., a control flow and a data flow or flows, until all those flows have ended, and outputs captured information concerning all the related flows to the flow comparison part 108 at the time when all the related flows have ended. This allows simultaneous comparison of captured information concerning the control flow and the related data flow or flows, and captured information concerning one of the related flows in which a difference occurs is output from the result output part 109. As a consequence, for example, an external analysis terminal or the like can comprehensively inspect the related flows to check an influence of the change in rules.

Figure 15:
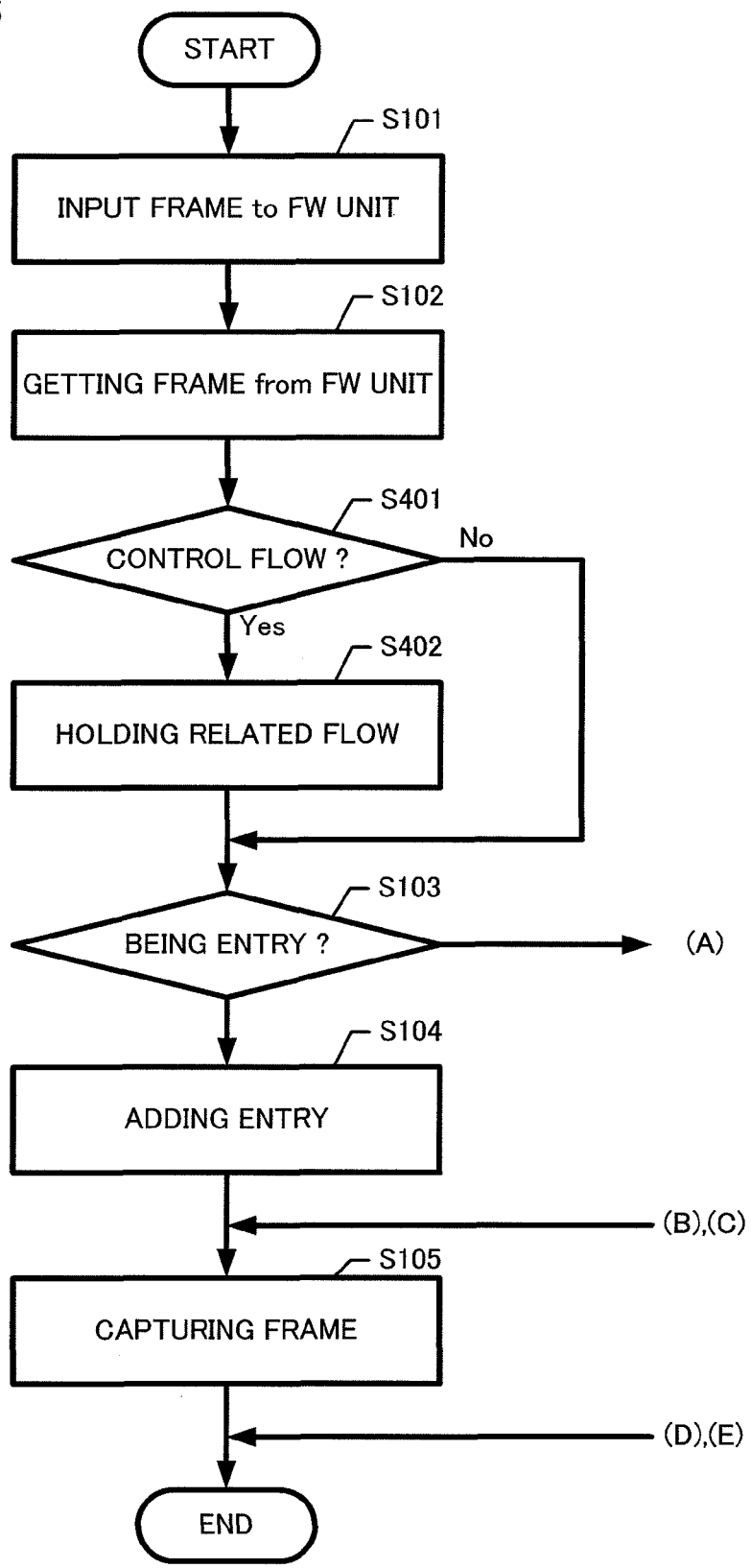
FIG. 15 is a flowchart showing a verification operation according to the fifth embodiment.
Figure 16:
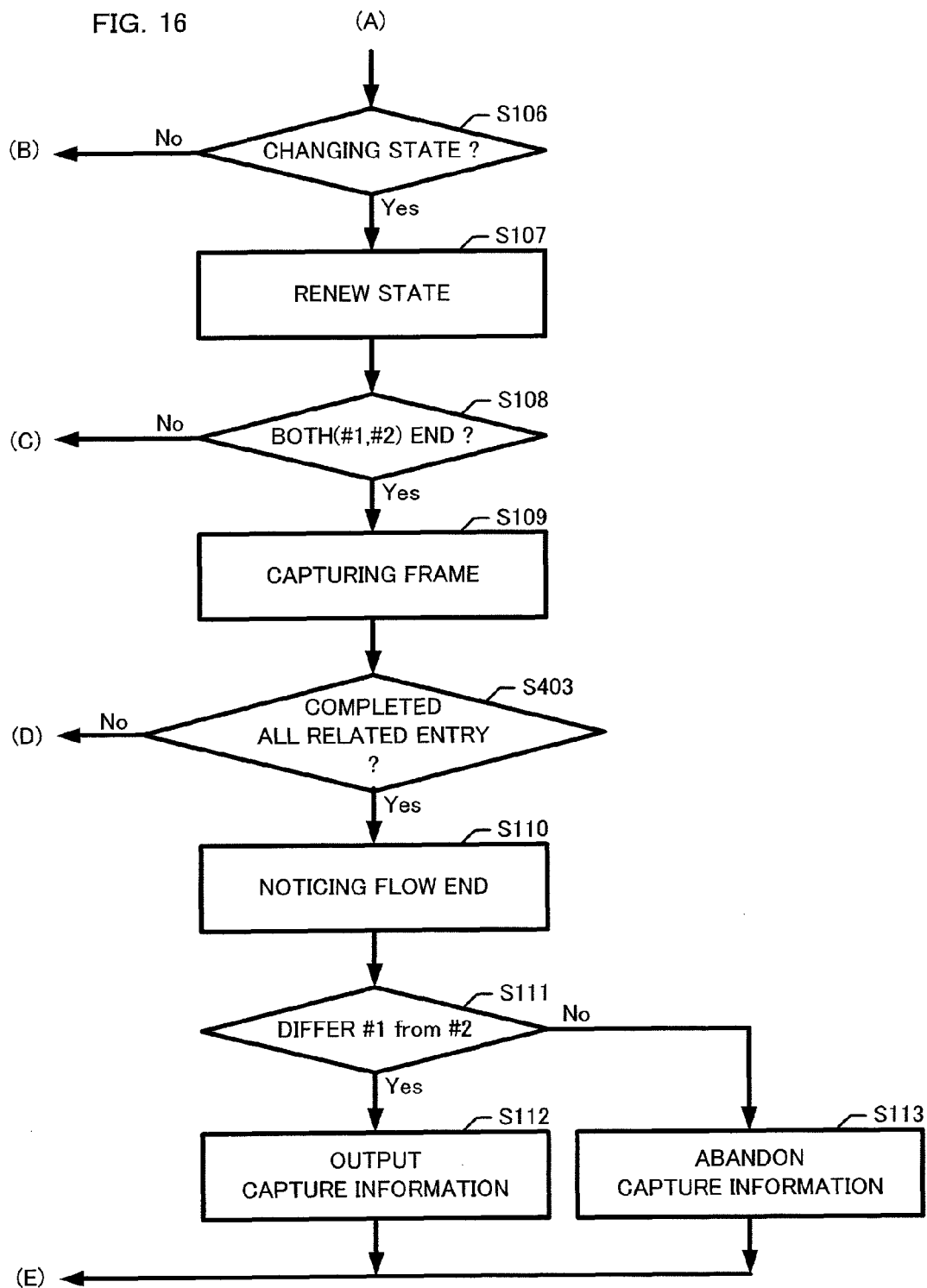
FIG. 16 is a diagram showing a continued part of the flowchart shown in FIG. 15.

Next, the verification operation of the rule verification apparatus 100 having the above-described structure will be described with reference to a flowchart shown in FIGS. 15 and 16. In FIGS. 15 and 16, the same steps as those shown in FIG. 5 are represented by the same reference numerals, and a detailed description thereof is omitted.

First, a frame transmitted from the client or the server is copied by the input frame copy part 101 or 103, and is input to the FW units #1 and #2 (step S101). The frames output from the FW units #1 and #2 are obtained by the flow state monitoring part 105 (step S102). The frames output from the FW units #1 and #2 are also obtained by the control flow detection part 501, and it is determined whether or not the frame is a frame indicating a control flow (step S401).

As a result, if the identifier of the frame indicates a frame of a control flow (Yes in step S401), the control flow detection part 501 recognizes a related data flow from the content of the frame, and notifies the related flow holding part 502 of the identifiers of the control flow and the related data flow. The notified related flow is held by the related flow holding part 502 (step S402). If the frame obtained by the control flow detection part 501 is not a frame of a control flow (No in step S401) or after the related flow is held by the related flow holding part 502, as in the first embodiment, the flow state monitoring part 105 searches the flow management table 106 for an entry associated with the obtained frame (step S103).

As a result of the search, if the entry is not registered (No in step S103), as in the first embodiment, a new entry is added to the flow management table 106 (step S104). Then, the flow state is renewed to the "in-connection" state, and the frame holding part 107 holds the frame as captured information (step S105).

As a result of the search for the entry by the flow state monitoring part 105, if the entry is already registered (Yes in step S103), the flow state monitoring part 105 refers to the content of the frame, and determines whether or not the flow state has changed (step S106). If the flow state has not changed (No in step S106), the frame is held by the frame holding part 107 (step S105). If the flow state has changed (Yes in step S106), the flow state monitoring part 105 renews the flow state stored in the flow management table 106 (step S107).

Then, the flow state monitoring part 105 refers to an entry in which the state is renewed, and determines whether or not the flow states corresponding to both the FW units #1 and #2 are set in the "end" state (step S108). If it is determined by the flow state monitoring part 105 that the flow states corresponding to both FW units are not set in the end state (No in step S108), the frame is held by the frame holding part 107 (step S105).

If the flow states corresponding to both FW units are set in the end state (Yes in step S108), the frame is also held by the frame holding part 107 (step S109). Then, the flow state monitoring part 105 retrieves a flow related to the flow in which the states are set in the end state from the related flow holding part 502, and determines whether or not the flow states of all related flows are set in the end state (step S403). That is, if the flow state of a data flow is set in the end state, it is determined whether or not a related control flow and all data flows related to the control flow have ended. If the flow state of a control flow is set in the end state, it is determined whether or not all related data flows have ended.

As a result of the determination, if the flow states of all the related flows are not set in the end state (No in step S403), the flow state monitoring part 105 does not notify the frame holding part 107 of the end of the flow state, and the process described above is repeated for a subsequent frame output from the FW unit #1 or #2. If the flow states of all the related flows are set in the end state (Yes in step S403), the flow state monitoring part 105 notifies the frame holding part 107 of the end of the flows (step S110).

The frame holding part 107 notified of the end of the flows outputs captured information concerning each of all the related flows that have ended to the flow comparison part 108. When the captured information is output to the flow comparison part 108, the flow comparison part 108 compares two captured information items for each flow, and determines whether or not there is a difference between the groups of frames held for the same flow (step S111). As a result of the determination, if there is a difference between the groups of frames (Yes in step S111), the captured information concerning the overall flow is output to the outside via the result output part 109 (step S112). As a result of the comparison of captured information, if there is no difference between the groups of frames (No in step S111), the flow comparison part 108 abandons the captured information (step S113).

According to the fifth embodiment, therefore, a control flow and a related data flow are held. When the flow state of a single flow ends, it is determined whether or not all related flows have ended, and captured information items are compared for all the related flows only when all the related flows have ended. Therefore, when captured information is output to the outside, captured information concerning one of all related flows in which a difference occurs between groups of frames is output, thus allowing a comprehensive inspection of an influence of the change in rules while also taking the mutual relationship between flows into account.

In the first to fifth embodiments described above, the FW units #1 and #2 and the rule verification apparatus 100 are separately provided. However, a rule verification apparatus according to the present art may be provided integrally with an FW unit.

What is claimed is:

1. A rule verification apparatus for examining a change in traffic due to a difference between rules for controlling traffic, the verification apparatus comprising:
    a processor and a memory, the memory embodying instructions that when executed by the processor cause the processor to execute a procedure, the procedure comprising:

obtaining a first group of first frames obtained by applying a first rule to a flow of traffic corresponding to a transaction;

obtaining a second group of second frames obtained by applying a second rule to the flow;

referring to the first group and the second group obtained by said obtaining;

monitoring starts and ends of each of the flows to which each of the first and second rules is applied;

holding the first frames included in the first group and the second frames included in the second group obtained by said obtaining;

comparing the first frames and the second frames held by said holding, when said monitoring detects both the end of the flow in the first group and the end of the flow in the second group; and discarding both the first frames in the first group and the second frames in the second group held by said holding only when the first frames and the second frames held by said holding coincide with each other, based on a result of the comparing on each detecting of both the end of the flow in the first group and the end of the flow in the second group.

2. The rule verification apparatus according to claim 1, the procedure further comprising:

outputting the first frames and the second frames held by said holding, not discarded by said discarding, in case of having a difference between the first frames and the second frames held by said holding.

3. The rule verification apparatus according to claim 2, wherein said outputting includes a filter in which a non-verified flow that a change in traffic is not to be examined is set in advance, and the first frames and the second frames held by said holding, corresponding to the non-examined flow set in the filter are not outputted and are discarded.

4. The rule verification apparatus according to claim 1, wherein said monitoring includes a management table, including an entry for each flow, for managing a flow state associated with the first rule and a flow state associated with the second rule on an entry-by-entry basis, and when said obtaining obtains a frame, said monitoring renews one of the entries in the management table that is associated with a flow to which the obtained frame belongs according to a type of the frame.

5. The rule verification apparatus according to claim 4, wherein when said obtaining obtains a start frame indicating a start of the flow, said monitoring adds new entry to the management table, and sets a flow state associated with a rule applied to the start frame to a connection state in the added new entry.

6. The rule verification apparatus according to claim 4, wherein when said obtaining obtains an end frame indicating an end of the flow, said monitoring sets a flow state associated with a rule applied to the end frame to an end state in one of the entries in the management table associated with the flow.

7. The rule verification apparatus according to claim 1, the procedure further comprising:

detecting an occurrence of a time-out in the flow during an application of the first or second rule when said obtaining does not obtain a subsequent frame until an appointed time elapses after obtaining a preceding frame, wherein when said detecting detects the occurrence of the time-out, said discarding starts comparison between the first frames and the second frames held by said holding.

8. The rule verification apparatus according to claim 1, wherein said obtaining includes a converter for converting each of the first frames included in the first group and each of the second frames included in the second group so as to use an address conversion method identical to an address conversion method used in case of the first and second rules being applied to the flow.

9. The rule verification apparatus according to claim 1, the procedure further comprising:

determining whether the first frames included in the first group or the second frames included in the second group obtained by said obtaining have a frame of a control flow for controlling data transfer or a frame of a data flow for transferring data; and second holding, when said determining determines the frame of the control flow, a data flow related to the control flow, wherein when said monitoring detects the end of the flow in the first group and the end of flow in the second group and detects the end of the control flow and data flow stored in said second holding, said discarding compares the first frames and the second frames corresponding to all of the flows whose end is detected.

10. The rule verification apparatus according to claim 1, wherein the first rule and the second rule specify a frame blocked by a firewall.

11. A rule verification method for examining a change in traffic due to a difference between rules for controlling traffic, the rule verification method comprising:

obtaining a first group of first frames obtained by applying a first rule to a flow of traffic corresponding to a transaction;

obtaining a second group of second frames obtained by applying a second rule to the flow;

referring to the first group and the second group obtained by said obtaining;

monitoring starts and ends of each of the flows to which each of the first and second rules is applied;

holding the first frames included in the first group and the second frames included in the second group obtained by said obtaining;

comparing the first frames and the second frames held by said holding when said monitoring detects both the end of the flow in the first group and the end of the flow in the second group; and discarding both the first frames in the first group and the second frames in the second group held by said holding only when the first frames and the second frames held by said holding coincide with each other, based on a result of the comparing on each detecting of both the end of the flow in the first group and the end of the flow in the second group, executed by a processor.

* * * * *